(12) United States Patent
Namvar

(10) Patent No.: US 9,160,469 B2
(45) Date of Patent: *Oct. 13, 2015

(54) SIGNAL TRANSMISSION MANAGEMENT SYSTEM

(76) Inventor: Kianoush Namvar, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/980,296

(22) Filed: Dec. 28, 2010

(65) Prior Publication Data

US 2011/0153733 A1 Jun. 23, 2011

Related U.S. Application Data

(63) Continuation of application No. 10/563,396, filed as application No. PCT/SE2004/000219 on Feb. 18, 2004, now Pat. No. 8,973,035.

(30) Foreign Application Priority Data

Feb. 18, 2003 (SE) ...................................... 0300435

(51) Int. Cl.
H04N 21/2547 (2011.01)
H04N 21/258 (2011.01)
H04H 60/06 (2008.01)
G06Q 30/02 (2012.01)
H04H 60/07 (2008.01)
H04N 7/173 (2011.01)
(Continued)

(52) U.S. Cl.
CPC .............. *H04H 60/06* (2013.01); *G06Q 30/02* (2013.01); *H04H 60/07* (2013.01); *H04N 7/17309* (2013.01); *H04N 21/2547* (2013.01); *H04N 21/25866* (2013.01); *H04N 21/25883* (2013.01); *H04N 21/25891* (2013.01); *H04N 21/26225* (2013.01); *H04N 21/44222* (2013.01); *H04N 21/6582* (2013.01); *H04N 21/812* (2013.01); *H04H 20/30* (2013.01); *H04H 20/33* (2013.01); *H04H 60/31* (2013.01); *H04H 60/37* (2013.01); *H04H 60/66* (2013.01)

(58) Field of Classification Search
None
See application file for complete search history.

(56) References Cited

U.S. PATENT DOCUMENTS 6,698,020 B1 * 2/2004 Zigmond et al. ................ 725/34
6,760,916 B2 * 7/2004 Holtz et al. ..................... 725/34
(Continued)

FOREIGN PATENT DOCUMENTS

JP 2000-124865 4/2000
JP 2000-333043 11/2000
(Continued)

Primary Examiner — Brian T Pendleton
Assistant Examiner — Jean D Saint Cyr
(74) Attorney, Agent, or Firm — The Webb Law Firm

(57) ABSTRACT

The present invention relates to a system for transmitting a set of signals to a plurality of subscriber receivers, where each signal represents information which belongs to a particular contents category. At least one client computer coupled to a central management server. Thus, the client computer(s) may produce administrative instructions for organizing a sub-set of the signals to be transmitted to the subscriber receivers. The central management server receives the administrative instructions pertaining to the transmission of the signals. In response to the administrative instructions, the central management server organizes and synchronizes signals originating from one or more signal sources before these signals are transmitted to at least one of the plurality of subscriber receivers. Thus, the contents category of each signal determines which signal that will be presented in which subscriber receiver.

23 Claims, 7 Drawing Sheets

(51) Int. Cl.
- *H04N 21/262* (2011.01)
- *H04N 21/442* (2011.01)
- *H04N 21/658* (2011.01)
- *H04N 21/81* (2011.01)
- *H04H 20/30* (2008.01)
- *H04H 20/33* (2008.01)
- *H04H 60/31* (2008.01)
- *H04H 60/37* (2008.01)
- *H04H 60/66* (2008.01)

(56) References Cited

U.S. PATENT DOCUMENTS

| | | | |
|---|---|---|---|
| 2003/0028890 A1* | 2/2003 | Swart et al. | 725/91 |
| 2003/0105809 A1* | 6/2003 | Yoshii et al. | 709/203 |

FOREIGN PATENT DOCUMENTS

| | | |
|---|---|---|
| JP | 2001-045449 | 2/2001 |
| JP | 2002-223431 | 8/2002 |

\* cited by examiner

Fig 6

SIGNAL TRANSMISSION MANAGEMENT SYSTEM

CROSS-REFERENCE TO RELATED APPLICATIONS

This application is a continuation of U.S. patent application Ser. No. 10/563,396 filed on Oct. 19, 2007 now U.S. Pat. No. 8,973,035, which is a National Stage Entry and claims the benefit of filing date and priority to International Application No. PCT/SE04/00219 filed on Feb. 18, 2004, which claims the benefit of the filing date and priority to Swedish Patent Application No. 0300435-5 filed on Feb. 18, 2003. All of the above applications are hereby incorporated by reference in their entirety.

THE BACKGROUND OF THE INVENTION AND PRIOR ART

The present invention relates generally to a solution for transmission of signals to a plurality of subscriber receivers. More particularly the invention relates to a system according to claim 1 and a client computer according to the preamble of claim 13. The invention also relates to a computer program according to claim 22 and a computer readable medium according to claim 23.

Advertising plays an important role in the transmission of broad- or multicast signals, such as TV-signals and streaming transmissions over the Internet. In the near future, it is expected to become increasingly important to improve the relevance of the advertising messages and provide an attractive pricing for the advertisers, particularly for smaller and/or local companies. Therefore, it is essential that an adequate targeting of the transmitted commercial information be accomplished, at least as a complement to the existing transmission resources for broadcast signals. It is also important that the broadcasters are offered a cost efficient solution.

The international patent application WO02/098132 of the present applicant describes a solution for controlling the decoding of mass distributed coded signals, such as digital satellite channels, with a high precision to a large number of subscriber receivers.

U.S. patent application publication 2002/0087976 describes a system for delivering broadcast-quality video with targeted advertising to viewers over the switched communication network. For example, program streams with appropriately inserted splice points may be transmitted from a network head end node to one or more egress nodes via the switched network. Demographically targeted advertising is then inserted into the program streams at the egress nodes for subsequent delivery to individual subscribers.

A solution for providing demographically targeted TV-commercials is also disclosed in the European patent application No. 424 648, A2. An advertising management system for digital video streams, which allows ads to be matched to groups of subscribers, is described in the international patent application WO00/64165. The U.S. Pat. No. 4,602,279 describes a solution for providing a targeted profile in interactive TV-distribution network.

Furthermore, various software solutions including graphical user interfaces are also known for editing individual video files. For example, the international patent application WO99/52115 describes a solution for non-linear video editing which facilitates the editing of separate fields in a particular frame of a video clip.

Hence, the prior art includes various examples of solutions, both for targeting signal transmissions to selected groups of receivers, and for editing video signals via a graphical user interface. However, there is yet no solution which allows one or more remote clients to organize their particular fraction of a larger amount of transmissions that are administered via a central management node.

SUMMARY OF THE INVENTION

The object of the present invention is therefore to provide a signal transmission solution, which alleviates the problems above and thus enables distributed clients to conveniently organize their transmissions via a shared resource.

According to one aspect of the invention the object is achieved by a system for transmitting signals to a plurality of subscriber receivers. It is presumed that each signal represents a type of information which belongs to a particular contents category, which may be specified in a label associated with the signal. The system includes a central management server, which is adapted to receive administrative instructions pertaining to the transmission of the signals to the subscriber receivers. In response to the administrative instructions, the central management server organizes signals from at least one signal source before trans-mission thereof to the subscriber receivers. The system also includes at least one client computer, which each has an interface towards the central management server and is adapted to produce administrative instructions for organizing a sub-set of the signals to be transmitted via the central management server.

This system is advantageous because it allows a given amount transmission resources to be shared among a number of operators, and at the same time, provides each operator with a large degree of freedom with respect to how their portion of the resources is utilized. Moreover, the system is well adapted to feed back monitoring information pertaining to the subscribers' behaviors and preferences to the operators, such that they may enhance their planning of future transmissions.

According to a preferred embodiment of this aspect of the invention, the system includes a central transmission unit which is adapted to receive the signals from the central management server. The central transmission unit transmits these signals (e.g. by means of a multiplexing technique) to the subscriber receivers via a central signal distribution system in accordance with an organization scheme produced by the central management server. Thus, a unified control and monitoring of the signal transmission is accomplished.

According to another preferred embodiment of this aspect of the invention, the organization scheme specifies for each signal to be transmitted, a transmission resource, a time instance (preferably local) and a contents category. This information is either inserted in the signal, or is transmitted in parallel with the signal. The parallel signal may further originate from a local transmitter, i.e. a station whose signals only reach a fraction of the potential subscriber receivers, and which does not distribute its signals via the central transmission unit. The contents category determines which sub-segment that will be presented in which subscriber receiver for at least one segment of the signal. Thereby, by means of the organization scheme, an operator may direct certain signal sub-segments, e.g. commercials, to subscriber receivers associated with users belonging to specific user categories (or having certain profiles).

Preferably, each of the subscriber receivers contains an interpreting unit having a user specific key, which represents a profile category of at least one user associated with the subscriber receiver. The interpreting unit is adapted to control the signal reception, such that the key in combination with a piece of contents category information received with respect to a segment of the signal, control the subscriber receiver to present a predetermined sub-segment having been transmitted via a particular transmission resource. Since all sub-segments (along with relevant contents category information) are sent to all subscriber receivers, and the signal actually being decoded in each receiver is determined by the interpreting unit, the system becomes very robust. For instance, if the signal is temporarily disturbed, or by other means distorted, this may cause an erroneous decoding in the subscriber receivers. However, as soon as the signal regains an acceptable signal quality each receiver will immediately continue to decode the intended signal. Thus, there is no risk that the tracking is lost.

According to yet another preferred embodiment of this aspect of the invention, the system includes a return channel from at least one subscriber receiver to the central management server. The return channel is adapted to forward activity monitoring information pertaining to signals having been presented in the subscriber receiver to the central management server. Moreover, the central management server is adapted to generate a compiled data set representing different kinds of reports and the activity-monitoring information, for example over a certain time period and/or from a group of subscriber receivers.

According to still another preferred embodiment of this aspect of the invention, at least one of at least one client computer includes a means for manually entering activity-monitoring information pertaining to signals that have been presented in one or more subscriber receivers. Based on the manually entered information (which may additionally or alternatively relate to other data than activity-monitoring, e.g. demographical data), a compiled data set is produced by the central management server.

Preferably, the client computers are adapted to receive the compiled data set from the central management server. Thus, they may produce their respective administrative instructions on basis of this information. It is further preferable if the compiled data set is presented graphically, e.g. in a diagram format. Naturally, an efficient planning of the signal transmissions is thereby facilitated.

According to yet another preferred embodiment of this aspect of the invention, the system includes at least one billing unit which is adapted to produce billing information pertaining to a respective utilization of the transmission resources that are administrated by the central management server. Preferably, a central billing unit extracts the required data from the organization scheme produced by the central management server and generates a bill to each client computer operator. Moreover, a peripheral billing unit may be associated with one or more of the client computer. The peripheral billing unit is adapted to generate corresponding bills to advertisers who have had their commercials transmitted via the operator in question.

According to still another preferred embodiment of this aspect of the invention, the system includes at least One auxiliary distribution channel outside the organization scheme produced by the central management server, which is adapted to transmit signals to the subscriber receivers. Thereby, an operator may choose to distribute a fraction of his/her signals via an alternative route as a complement or a default channel to the signals transmitted under the organization of the central management server. Naturally, signals that do not pass via the proposed central management server will not be affected by the administration performed here. Nevertheless, this does not preclude that also these signals are categorized depending on their contents, and have a specific signal code.

According to another aspect of the invention, the object is achieved by a client computer as initially described, which is characterized in that it includes a graphical user interface adapted to present a time relationship between different signals to be transmitted on at least one channel over which the client computer has a management control. Such an interface is desirable, since it provides each operator with an intuitive overview of the resources at his/her disposal at each time instance. Naturally, this is a vital tool when planning future signal transmissions.

According to another preferred embodiment of this aspect of the invention, the graphical user interface includes a first graphical means adapted to, for each of the signals to be transmitted on the at least one channel, present the signal's contents category. Furthermore, a second graphical means in the graphical user interface is adapted to, for at least a sub-set of the signals to be transmitted, enable a user to manipulate segments of each signal, such that a particular sub-segment thereof will be presented in each subscriber receiver of the subscriber receivers, which has a profile category matching a contents category associated with the particular sub-segment. Thereby, the operators' overview of the resources at his/her respective disposal is further enhanced.

According to another preferred embodiment of this aspect of the invention, the graphical user interface includes a third graphical means adapted to, for at least a sub-set of the signals to be transmitted on the at least one channel, enable the user to select a suitable sub-segment for each of a number of profile categories for a segment of a signal. This is another tool that improves the operators' possibilities of accomplishing an apposite planning of their transmissions, such that suitable signals are presented in each subscriber receiver.

According to yet another preferred embodiment of this aspect of the invention, the third graphical means, in turn, contains a selection means which is adapted to enable the user to select a profile category for each sub-segment. A default profile category may here be based on a compiled data set formed on basis of activity-monitoring information pertaining to signals having been presented in the subscriber receivers. Hence, the relevance of the signals presented in the subscriber receivers may be further improved without complicating the operators' planning of the signal transmissions.

According to still another preferred embodiment of this aspect of the invention, the third graphical means includes a selection means adapted to allow the user to select a geographical area within which subscriber receivers will present the sub-segment. A default geographical area is here based on positional information pertaining to signals that have been presented in the subscriber receivers previously. The positional information may originate from a coverage area (e.g. a satellite footprint or a cable network area), a positioning system (e.g. including a GPS-receiver) associated with the subscriber receiver or manually entered information, such as a country code, an area code or a postal code. Hence, the signal transmission planning is further facilitated.

According to a preferred embodiment of this aspect of the invention, the third graphical means includes a selection means which is adapted to enable the user to select a priority level for each sub-segment. The priority level denotes a relative position of the sub-segment within a particular segment. Thereby, the operators may conveniently distribute individual commercials over a commercial break, such that each commercial attains an adequate position in relation to the other commercials.

According to a preferred embodiment of this aspect of the invention, the client computer contains a compiler, which is adapted to produce a preliminary organization of the signals before transmitting corresponding administrative instructions to the central management server. Preferably, the graphical user interface also includes a fourth graphical means adapted to enable a client computer user to manipulate the preliminary organization of the signals. Moreover, the client computer preferably includes processing means adapted to produce administrative instructions to the central management server based on the user manipulations.

Thereby, any mismatches or planning mistakes may be discovered and corrected at the client computer, such that the risk of any undesired instructions being forwarded to the central management server is minimized. Moreover, a report based on the preliminary organization may be sent to a central administrator (typically located either at the client computer or at the central management server) before any administrative instructions are actually transferred, so that the central administrator may determine whether or not to accept the preliminary organization proposed by a client-computer user. Naturally, the central administrator may also decide to adjust the proposed parameters (manually or automatically), such that an acceptable organization is accomplished.

According to a further aspect of the invention the object is achieved by a computer program directly loadable into the internal memory of a computer, comprising software for controlling the functions of the above proposed client computer when said program is run on a computer.

According to another aspect of the invention the object is achieved by a computer readable medium, having a program recorded thereon, where the program is to make a computer control the functions of the above proposed client computer.

Thus, the invention offers an excellent tool for all operators who distribute mass media, such as satellite-TV, cable-TV, terrestrial broadcasting or Internet multicasting, and wish to increase the accurateness of any targeted messages in their transmitted signals. Moreover, the invention provides an efficient operator control of any additional transmission resources that the operators may wish to use temporarily to broadcast extra signals, such as commercials, to the subscriber receivers.

BRIEF DESCRIPTION OF THE DRAWINGS

The present invention is now to be explained more closely by means of preferred embodiments, which are disclosed as examples, and with reference to the attached drawings.

FIG. 6 shows a fourth example of a graphical user interface of a client computer according to an embodiment of the invention.

DESCRIPTION OF PREFERRED EMBODIMENTS OF THE INVENTION

Figure 1:
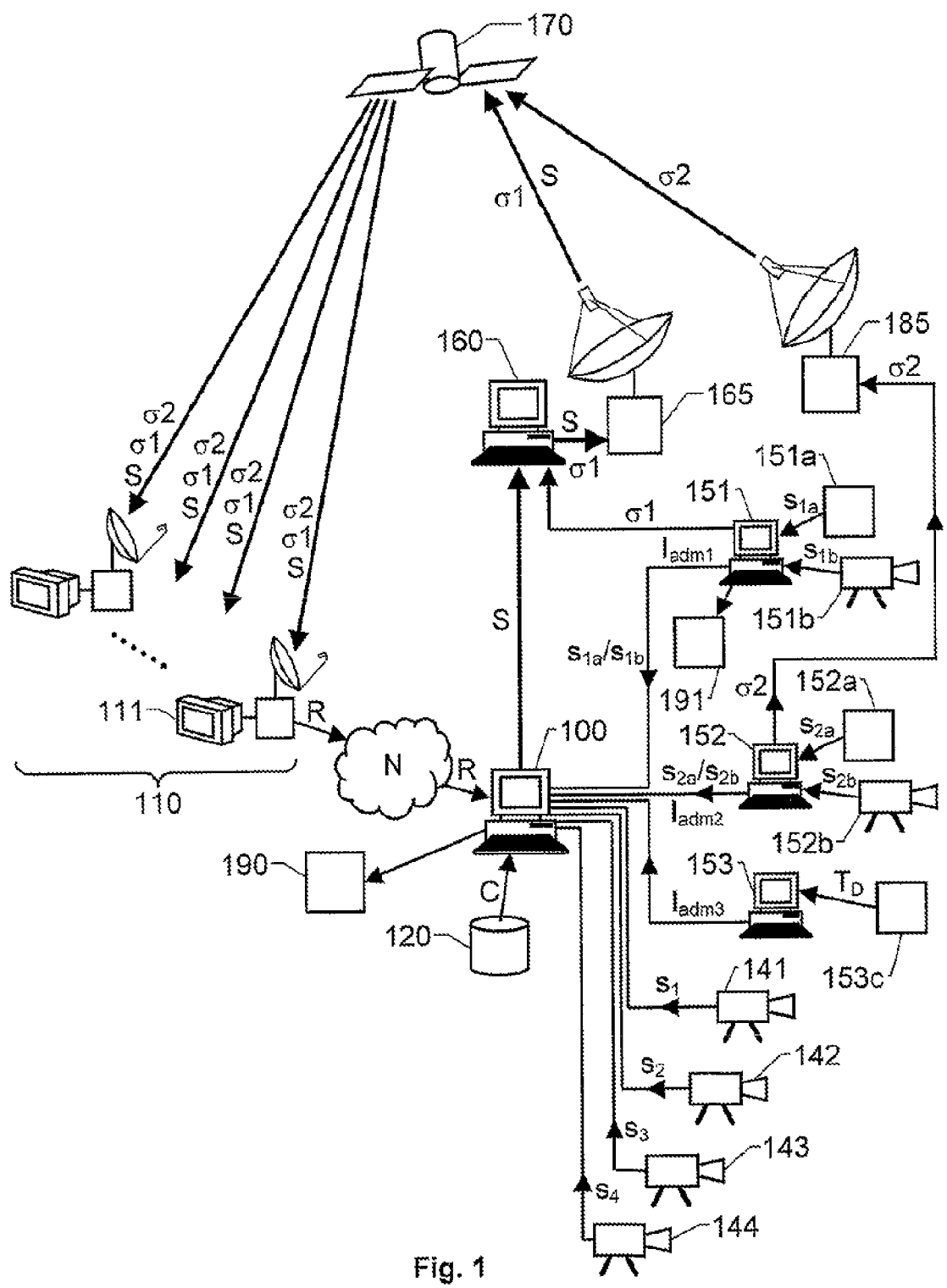
FIG. 1 shows a system for transmitting signals to a number of subscriber receivers according to an embodiment of the invention.

FIG. 1 shows an example of a proposed system for transmitting signals S to a number of subscriber receivers 110. Each signal S is presumed to represent a type of information, which belongs a particular contents category, such as "sports", "cultural event", "news", "advertisement" etc. Naturally, the contents category may be relatively detailed, or be divided into rather specialized areas, which may be primarily intended for viewers resident within a particular area and/or belong to a limited demographic group (e.g. with respect to type of household, age, education, income level and preferred language).

A number of client computers 151, 152 and 153 each has an interface towards a central management server 100. Each of the client computers is also adapted to produce administrative instructions $I_{adm1}$, $I_{adm2}$ and $I_{adm3}$ respectively for organizing a sub-set of the signals S to be transmitted to the subscriber receivers 110. This is accomplished via the central management server 100, which is adapted to receive the administrative instructions $I_{adm1}$, $I_{adm2}$, $I_{adm3}$, and in response thereto organize incoming signals that may originate from many different sources of which FIG. 1 illustrates a few examples. For instance, the client computer 151, 152 may have access to one or more local signal sources in the form of recorded programs $s_{1a}$, $s_{1b}$ on tape, disk, file, etc. 151a, 152a or programs $s_{2a}$, $s_{2b}$ produced by a live camera 151b, 152b. Alternatively, the client computer 151, 152, 153 may have access to one or more remote signal sources 120, 141-144, which are either proprietary or shared with other client computers. Naturally, the signals from these sources may also be stored on beforehand C or be produced live $s_1$, $s_2$, $s_3$ and $s_4$ respectively.

Moreover, besides transmission of standard signals, data signals $T_D$ may be transmitted in the form e.g. text-TV, Super text-TV or an electronic program guide (EPG). Signals of this type may be inserted by a text insertion module 153c, which may be connected to any of the client computers 151-153.

A central transmission unit 160 in the system is adapted to receive the signals 5, either from the central management server 100, or directly from a client computer 151, and transmit the signals S, σ1 to the subscriber receivers 110 via a signal distribution system, which may include a ground satellite station 165 and one or more satellites 170. Alternatively, the signals S may be distributed via a cable network a terrestrial broadcasting system and/or over the Internet. Hence, depending on the distribution network, the subscriber receivers 110 may be TV-tuners, satellite signal decoders, computers or broadband mobile communication terminals (e.g. $3^{rd}$ generation mobile telephones or equivalent).

The central transmission unit 160 transmits the signals S according to an organization scheme which is produced by the central management server 100. For each signal S to be transmitted, the organization scheme specifies: a transmission resource to be used, an absolute start time instance (alternatively a relative time) and a contents category. The contents category determines for at least one segment of the signal 5, which of two or more sub-segments that will be presented in which subscriber receiver 110. Typically, the contents categories may be used to direct different commercials to different subscribers. Technically however, the contents category information may be used for controlling any subscriber receiver to present a particular signal sub-segment at any time, irrespective of whether its contents relates to a commercial, a news spot or something else.

Each of the subscriber receivers 110 namely includes an interpretation unit, which has a user specific key. This key represents a profile category of at least one user associated with the subscriber receiver. Thereby, the interpretation unit may be controlled in response to the data in a contents category field (e.g. included in an associated data label) of a received signal, such that the subscriber receiver presents a particular signal to the user. Exactly which signal that is presented is determined by a combination of the characteristics of the key and the data in a contents category field. Thus, during a commercial break, a subscriber receiver 111 associated with a viewer having an expressed interest for motor sports may present a commercial for an engine oil, distributed via a first transmission resource, while a subscriber receiver 111 associated with a viewer who is expected to be more interested in cooking may present a commercial for a new food processor, distributed via, a second transmission resource. If, however, the user lacks access to the signal which is expected to be most appropriate (e.g. because the subscriber receiver in question is not associated with the requested subscription, the signal is encrypted by means of a key to which the receiver lacks a decryption key or the signal is transmitted by means of a pay-per-view service which the user has not purchased) a default signal is instead presented to the user.

One or more subscriber receivers 111 may also be connected to the central management server 100 via a return channel N, for example over a telephone network. Thereby, the subscriber receivers 111 may forward activity-monitoring information R pertaining to signals S having been presented in the particular subscriber receiver 111 to the central management server 100. The central management server 100 may then generate a compiled data set, which represents the activity-monitoring information R, such that this information can be used when planning future signal transmissions, particularly with respect to any directed signal sub-segments. Preferably, the activity-monitoring information R is sent to the central management server 100 under a virtual identification code (i.e. a code being different from the subscriber receiver's 111 actual ID code), such that user associated with the subscriber receiver 111 can be anonymous. The specific identity of each user is namely seldom interesting from a signal transmission planning point-of-view.

According to a preferred embodiment of the invention, one or more of the client computers 151-153 have a means for manually entering the activity-monitoring information R. This means may thus be used either as an alternative or as a complement to the automatically generated activity-monitoring information R.

According to another preferred embodiment of the invention, at least one of the client computers 151, 152, 153 is adapted to receive such a compiled data set from the central management server 100, and produce its administrative instructions $I_{adm1}$, $I_{adm2}$, $I_{adm3}$ on basis thereof.

Moreover, the system preferably includes a central billing unit 190 connected to the central management server 100. The central billing unit 190 is adapted to produce billing information pertaining to each operator's utilization of the transmission resources that are administrated by the central management server 100. Correspondingly, one or more of the client computers may be associated with a peripheral billing unit 191, which in turn is adapted to produce billing information pertaining to each the services that advertisers have obtained via the operator in question, for example having their commercials transmitted. Preferably, the peripheral billing unit 191 produces its billing information on basis of the administrative instructions $I_{adm1}$ generated by the relevant client computer 151.

It is also preferred that at least one auxiliary distribution channel is provided outside the distribution resources being administrated by the central management server 100. For example, a first client computer 151 may have a direct-connection to the central transmission unit 160, such that it may transmit signals σ1 without passing through the central management server 100. Thereby, the central management server 100 could be used merely as a complement for transmitted additive signals to supplement a default signal distribution which is organized separately. Similarly, a second client computer 152 may have access to a transmission unit 185 of its own, through which signals σ2 may be transmitted to the subscriber receivers 110 outside the central management server 100. Additionally, any of the servers, computers and units 100, 151, 152, 153, 160, 190 and 191 respectively may be associated with one or more backup units to safeguard against failures and crashes.

Figure 2:
FIG. 2 shows an exemplary organization scheme according to an embodiment of the invention.

A more detailed description of the above-mentioned organization scheme will be presented below with reference to FIG. 2. This figure shows an exemplary organization scheme 200, which preferably is accessible via a graphical user interface at the central management server 100.

The scheme 200 specifies, for each signal to be transmitted, a transmission resource TV3, TV4, TV5, CNN, Fill1, Fill2, Fill3, and Fill4 respectively along a horizontal line. A scalable common time line 240 represents an absolute time reference for all the transmission resources. Preferably; a time line corresponding to the time line 240 in the client computer indicates a local time of the time zone in which the client computer is located. Naturally, this time reference may have to be adjusted by the central management server 100 in case the latter unit is located in a different time zone. Alternatively, the system may be based on a central time reference, administered by the central management server 100, and in each client computer this time reference is converted into an appropriate local time.

The scheme 200 also indicates a start time instance and a contents category (e.g. "Live sport event") for each signal. A vertical time indicator 210 designates a present time instance. Preferably, the time indicator 210 includes a set of downcounters 220 which for each transmission resource indicates the amount of time left until a next event on the transmission resource, i.e. when the signal transmitted thereon changes from representing a first type of content to a second type of content, or when a new program, commercial etc. begins. Additionally, a particular symbol field 230 for each transmission resource may illustrate the type of content for a following program (alternatively a current program) by means of a characteristic symbol, and a subtext associated thereto may specify details pertaining to any sub-segments of the currently transmitted signal segment. The organization scheme 200 may be generated on basis of an EPG.

Figure 3:
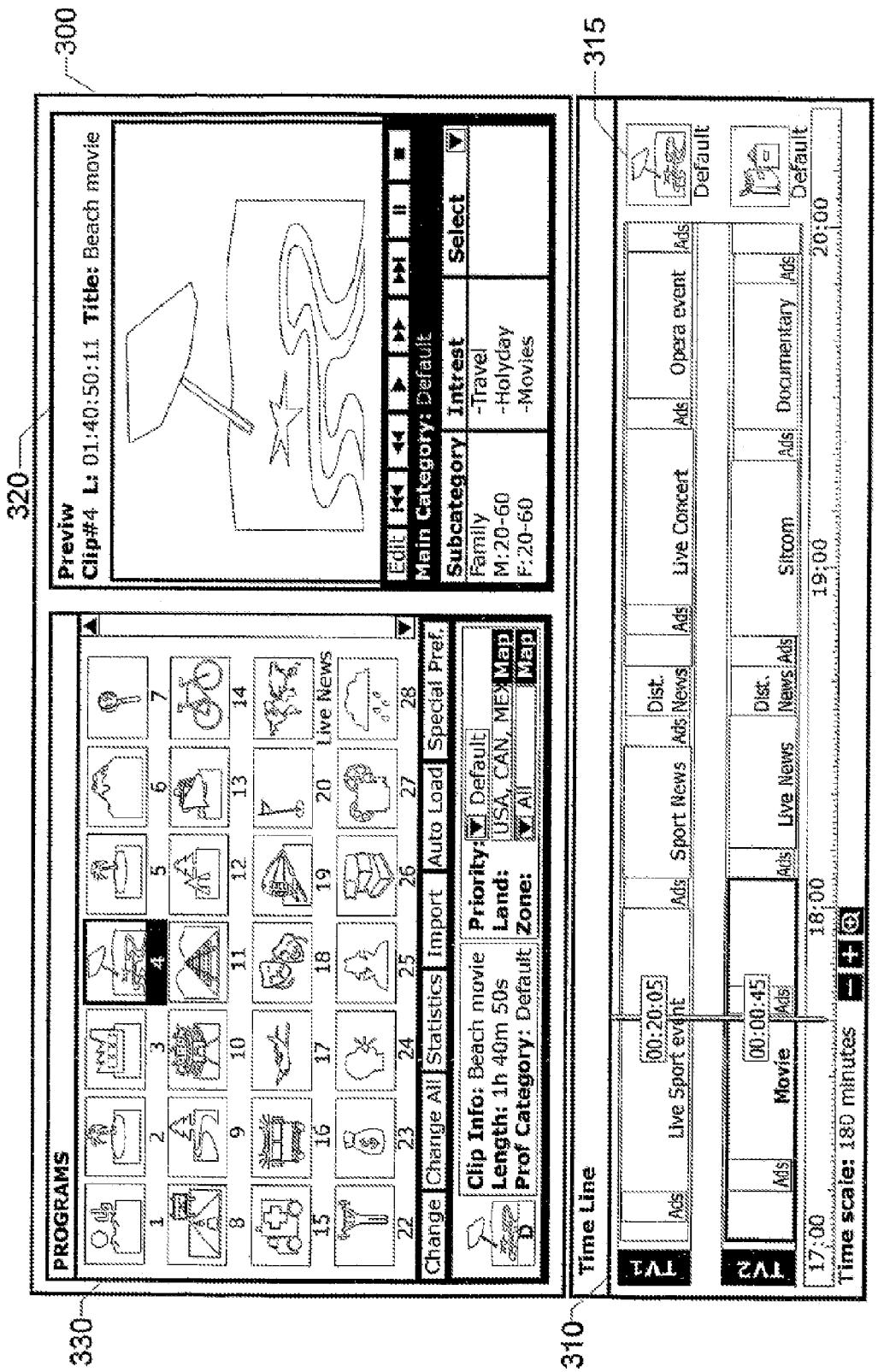
FIG. 3 shows a first example of a graphical user interface of a client computer according to an embodiment of the invention.

FIG. 3 shows a first example of a graphical user interface 300 of a client computer according to an embodiment of the invention. The interface 300 presents a time relationship between different signals to be transmitted on one or more channels TV1 and TV2, which are controlled by the client computer via a first graphical means 310. In this example the channels TV1 and TV2 are presumed to be handled by the same operator. Therefore, they appear conjunctly. For each channel TV1 and TV2, the first graphical means 310 presents the signals (programs/commercials) to be transmitted, and when the individual signal segments begin and end in the form of a respective time line. Preferably, a particular symbol field 315 for each channel illustrates, by means of a characteristic symbol, either the type of content for a program following the current program, or the current type of program depending on the user's choice. A subtext associated to the symbol field 315 may specify details pertaining to any sub-segments of the following program. The first graphical means 310 may either present the information on beforehand (to allow editing), or in real-time (for monitoring purposes). Of course, two versions of the first graphical means 310 may also be presented, such that one window displays future (i.e. editable) information, and one window displays current information.

A second graphical means 320 of the interface 300 shows an editing window in which an individual signal segment, such as a commercial may be manipulated to fit into a desired time slot on a channel TV1 or TV2 controlled via the operator's client computer. For example, the second graphical means 320 may be adapted to enable a user to cut a file (e.g. in MPEG-format) that represents a signal segment 4 to a desired length, set a desired contents category, etc. The second graphical means 320 may also be used to preview the signal segment 4 to check whether its contents is deemed suitable with respect to the contents of any neighboring signal segments.

The second graphical means 320 may also be used to adjust the sound level (i.e. volume) of a signal segment, such that this level becomes adapted to the sound level of any neighboring signal segments. Thereby, the transitions between different signal segments can be made relatively smooth.

A third graphical means 330 of the interface 300 shows an archive of stored signals and available live transmissions 1, 2, ..., 28 (e.g. TV-programs) that may be selected for transmission over the channels TV1 and TV2. A selection means in the third graphical means 330 enables the client computer user to allocate a desired set of characteristics, such as profile category, priority level, country, geographical zone and external information, to each of these signals 1-28. The third graphical means 330 also allows new signals to be imported and edited signals to be exported.

Figure 4:
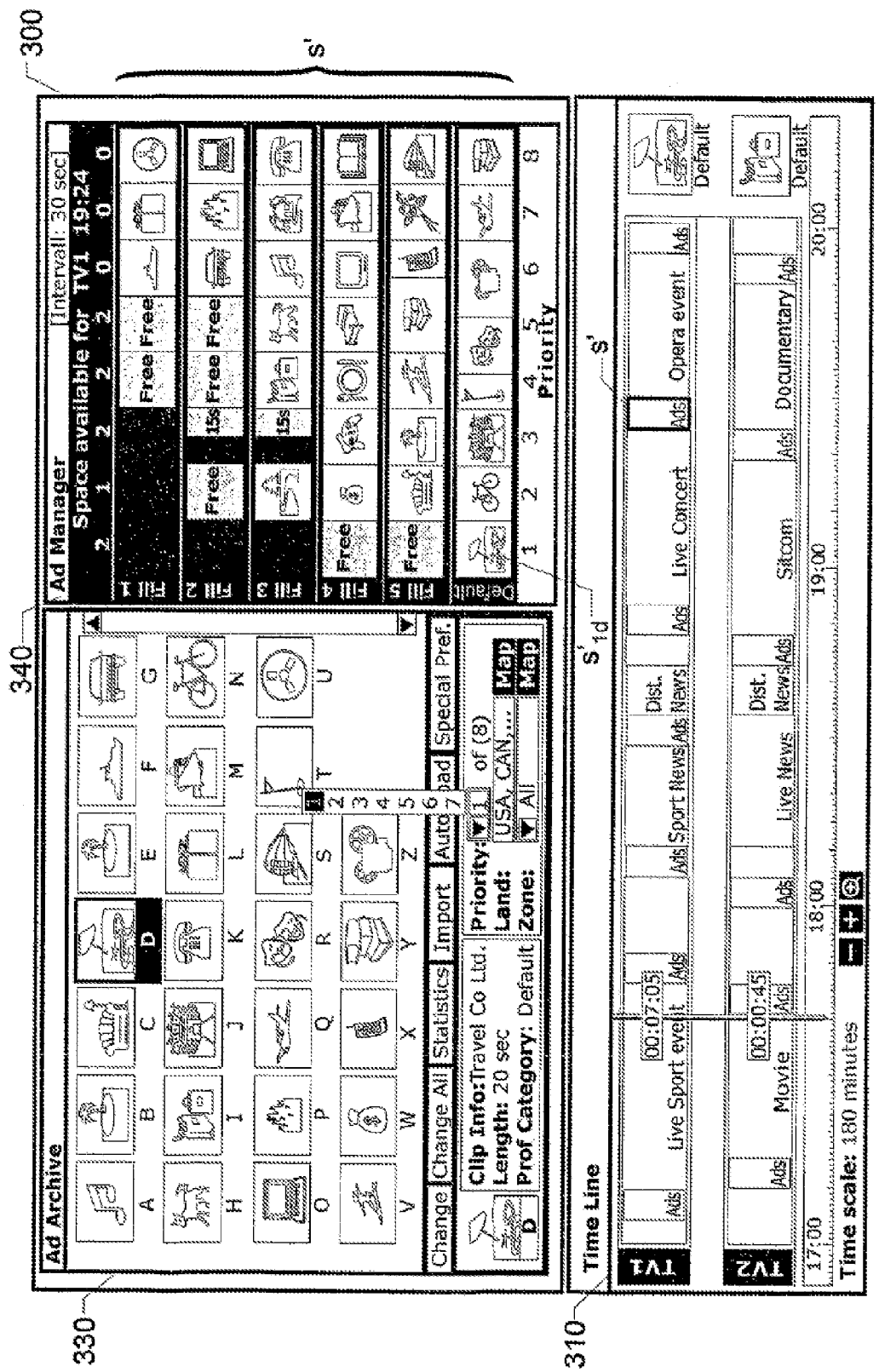
FIG. 4 shows a second example of a graphical user interface of a client computer according to an embodiment of the invention.

FIG. 4 shows another example of a view in the graphical user interface 300 which illustrates this feature more clearly. The third graphical means 330 here shows an archive of stored signals A, B, ..., Z in the form of commercials. For example, via the third graphical means 330, a particular commercial D may be allocated a default profile category (indicating that this is the "original" signal to be broadcast and that subscriber units whose key does not match any particular contents category will present this signal), a priority level 1 (meaning that the default-position for the commercial in any commercial break will be at a most attractive time slot, such as the first or the last), a nation-wide coverage (i.e. all zones) in the countries USA, Canada and Mexico. The third graphical means 330 also shows that the commercial D has a length of 20 seconds and that the advertiser's name is "Travel Co. Ltd.", information about the product, such as specifications data sheets, a listing over retailers, pricing etc. According to a preferred embodiment of the invention, a piece of billing information is generated each time a particular advertiser's commercial is transmitted, so that later a compiled bill which reflects the exposure of the advertiser's commercial may be produced automatically on basis of these pieces of billing information.

Moreover, in the FIG. 4, the editing window of the second graphical means, here referenced 340, now shows a sub-set of the signals that will be sent during sub-segments 1,2, ..., 8 of a signal segment s' on the channel TV1. The editing window also shows the number of transmission resources that are available for distributing the signals. However, this is not necessary for the functionality of allowing the client computer user to select different signals for different categories of viewers. For example, during a first time slot 1 (having the highest priority level) a default transmission resource for the channel TV1 will transmit a particular signal sub-segment $s'_{1d}$ having the default profile category. This means that the signal sub-segment $s'_{1d}$ is going to be presented in all subscriber receivers whose profile category does not match any other signal sub-segment transmitted at the same time on the alternative transmission resources Fill1, Fill2, Fill3, Fill4 or Fill5. In this example, there are no such signals. However, two of the alternative transmission resources, namely Fill4 and Fill5, are marked as free, while the remaining three transmission resources Fill2 and Fill3 are blocked (typically because they are reserved by another client computer). The transmission resources Fill4 and Fill5 may (if so desired) be used to transmit non-default signals. Thus, the client computer user may utilize the free resources Fill4 and Fill5 to distribute other signals that he/she finds suitable. A so-called auto loading procedure may be used to automatically fill the second graphical means 340 with commercials A-Z from the third graphical means 330. This means that a number of commercials, say A-G, are placed at respective appropriate slots 1-8 and transmission resources Default, Fill1, Fill2, Fill3, Fill4, Fill5 depending on their profile categories.

Figure 7:
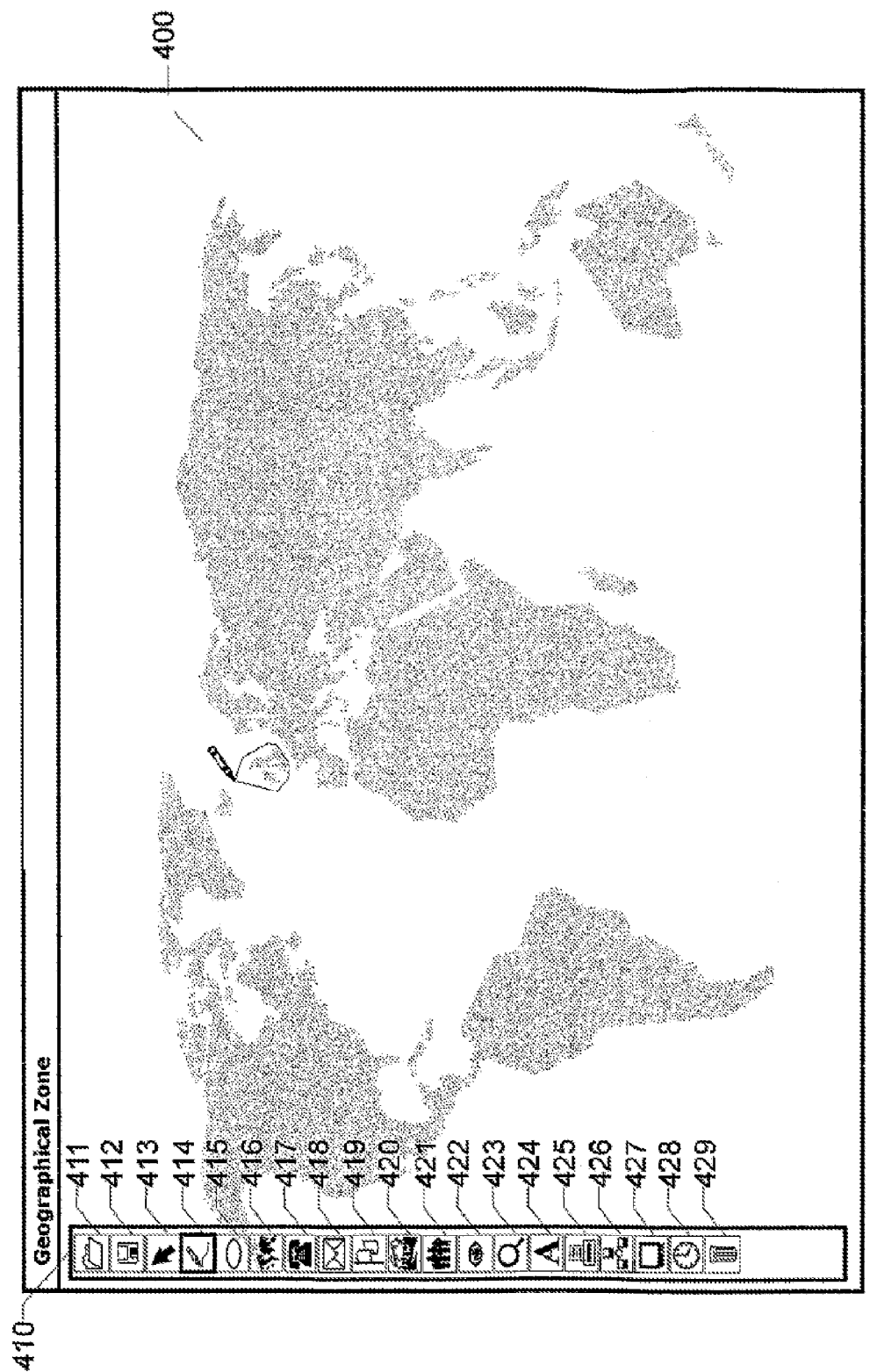
FIG. 7 shows an alternative window layout of a graphical user interface according to an embodiment of the invention.

For instance, any selection of new signal sub-segments may be based on geographical considerations. Namely, a piece of geographical area information associated with individual subscriber receivers makes it possible to control each subscriber receiver to respond to received geographical signal data, and present a particular signal which is relevant for its respective geographical area. Moreover, information with respect to viewer preferences in certain areas may be extracted from return signal information sent to the central management server. Preferably, such penetration information is presented graphically, for instance by means of a map as illustrated in FIG. 7.

Figure 5:
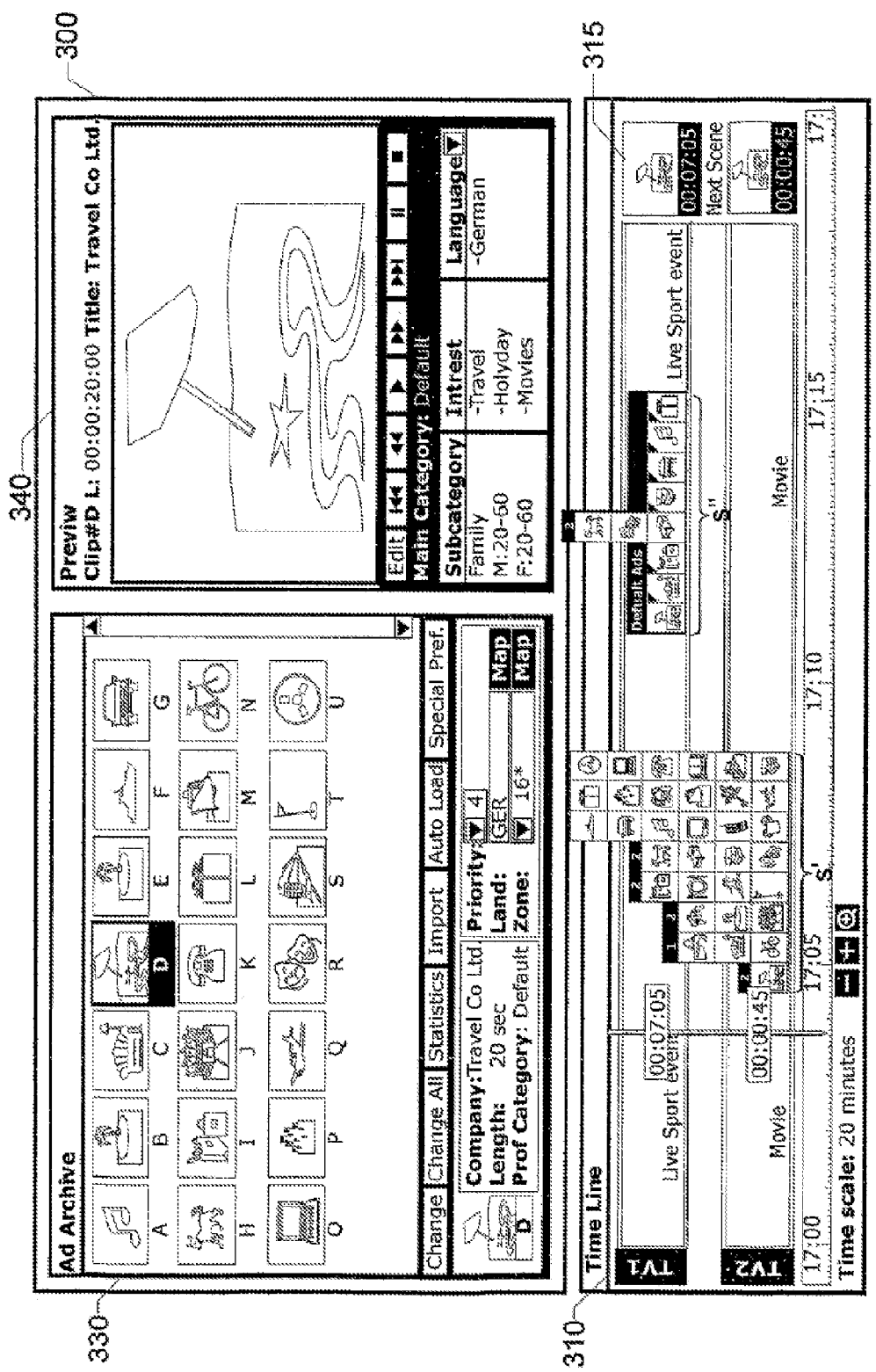
FIG. 5 shows a third example of a graphical user interface of client computer according to an embodiment of the invention.

FIG. 5 illustrates yet another example of a view in the graphical user interface 300 in a client computer. Here, the time scale in the first graphical means 310 is more detailed. The full contents of a first signal segment s' on the channel TV2 starting at 17:04:30 and ending at 17:08:40 is represented in an expanded graphical form. It is presumed that the operator has in total six parallel transmission resources at his/her disposal (typically one "original" resource and five "additional" resources), which may be shared with one or more other operators. The FIG. 5 shows that during a first time slot one of the resources is occupied, and two of the remaining resources are free; during a second time slot three of the resources are occupied, and one of the remaining three resources is free; during a third time slot three of the resources are occupied, and all the remaining three resources are free; during a fourth and a fifth time slot four of the resources are occupied, and both the remaining two resources are free; and during a sixth, a seventh and an eighth time slot all the resources are occupied.

According to an advantageous embodiment of the invention, if the central management server finds that two or more client computers have decided to transmit exactly the same sub-segment in two or more parallel time slots simultaneously, however via different transmission resources), the central management server manages the sub-segment and controls the transmission such that the sub-segment in question is only transmitted via one of these transmission resources. Thereby, the transmission resources are economized.

A second signal segment s" on the channel TV1 starting at 17:10:50 and ending at 17:15:20 is represented in a mainly compressed graphical form, i.e. a more compact format than the above-described expanded ditto. In this example, only a fourth time slot is represented in the expanded format. According to a preferred embodiment of the invention, the graphical format is shifted between the expanded and the compressed form by clicking on a particular time slot, or simply by moving a cursor symbol over there over. Again, a symbol field 315 may illustrate the type of content for a program following the current program by means of a characteristic symbol.

Preferably, the client computer includes a compiler adapted to produce a preliminary organization and synchronization of the signals on the channels at the operator's disposal before transmitting corresponding administrative instructions to the central management server. Hence, the compiler accomplishes a preliminary scheduling. Furthermore, the graphical user interface 300 preferably includes a fourth graphical means (not shown) which is adapted to enable a client computer user to manipulate the preliminary organization of the signals. The client computer should also include a processing means adapted to, based on any user manipulations, produce the administrative instructions and transmit these to the central management server or insert information (e.g. teletext, subtitles or EPG by means of data insertion unit) in the original signal to be transmitted to the subscriber receivers.

Figure 6:
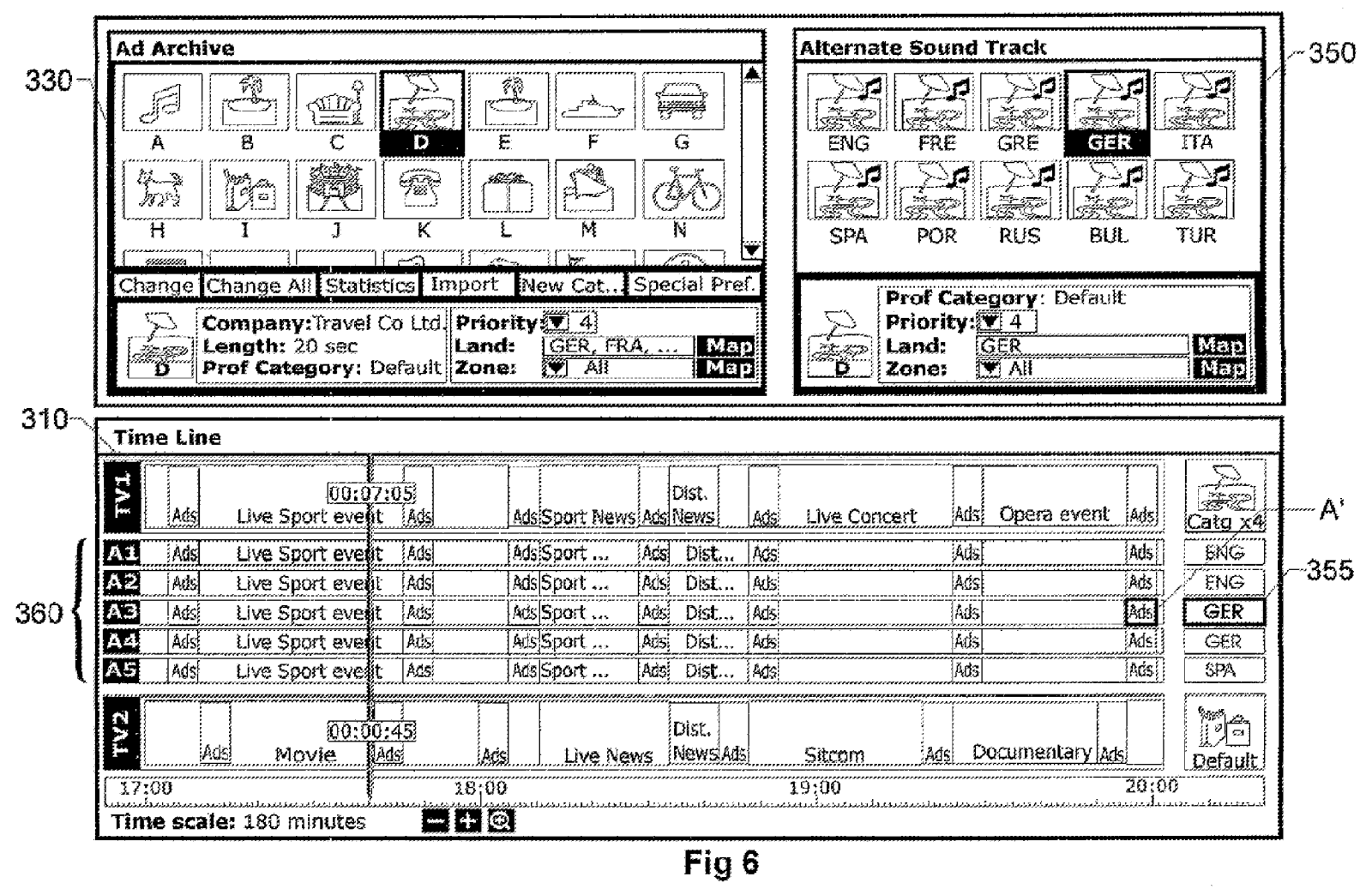

Yet another example of a graphical user interface of a client computer according to an embodiment of the invention is shown in FIG. 6. Here, the third graphical means 330 represents an advertisement archive, wherein a number of different commercials are stored. For example, by selecting a particular commercial D a set of available sound tracks ENG, FRE, GRE, GER, ITA, SPA, POR, RUS, BUL, TUR, associated with the commercial D are presented in a window 350. Typically, the sound tracks ENG, FRE, GRE, GER, ITA, SPA, POR, RUS, BUL, TUR represent different languages. However, technically they may contain arbitrary kind of acoustic information. According to a preferred embodiment of the invention, a relevant default distribution area and priority are associated with each sound track (e.g. the country code GER=Germany is associated with the sound track which contains German, etc.).

In this example, the first graphical means 310 shows a time line illustrating various sound tracks a tracks ENG, ENG, GER, GER and SPA being transmitted in parallel. The double ENG- and GER-tracks here represent stereo transmissions, whereas the single SPA-track represents a transmission of mono sound. According to a preferred embodiment of the invention, a selection of a commercial A' in the first graphical means 310 automatically highlights a corresponding sound track GER in the window 350 and an illustrating symbol 355 in connection with the time line.

FIG. 7 shows yet an alternative window of a proposed graphical user interface 400. Here, a button row 410 contains a first button 411 for opening a data file, a second button for saving a file, a third button 413 for selecting/highlighting an object, a fourth button 414 for drawing (on freehand) a figure to mark-up an area on the map, a fifth button 415 for drawing an elliptic figure to mark-up an area on the map, a sixth button 416 for opening another map, a seventh button 417 for selecting a particular area code, an eighth button 418 for selecting a particular postal code, a ninth button 419 for selecting a particular country or other geographical region, a tenth button 420 for selecting a particular household type, an eleventh button 421 for selecting a particular subscriber profile/category, a twelfth button 422 for showing details pertaining to a selected object, a thirteenth button 423 for zooming (in or out), a fourteenth button 424 for adding text elements, a fifteenth button 425 for printing an active file or object, a sixteenth button 426 for importing and exporting data, a seventeenth button 427 for previewing information (e.g. related to subscriber activities with respect to signals having been received), an eighteenth button 428 for displaying a particular time zone, and a nineteenth button 429 for discarding a selected object. Additionally, various buttons (not shown) for displaying coverage areas for different transmitters (e.g. satellite footprints) may be included.

A client computer user may use the buttons 411-429 in the button row 410 in order to aid him/her to direct certain signal segments to relevant subscriber receivers, and thereby accomplish an accurate signal targeting.

Naturally, any of the graphical means and windows described above with reference to the FIGS. 2-7 may be subjected to any standard window-functions, such as resizing, minimizing, maximizing, moving, cutting, pasting, dragging, dropping etc.

All the server and client computer functions described above with reference to the FIGS. 2-7 may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The carrier may be any entity or device capable of carrying the program. For example, the carrier may comprise a storage medium, such as a ROM (Read Only Memory), for example a CD (Compact Disc) or a semiconductor ROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

That which is claimed is:

1. A system for transmitting a set of signals from at least one signal source to a plurality of subscriber receivers, wherein each signal represents information belonging to a particular contents category, comprising:

at least one client computer coupled to a central management server wherein the at least one client computer adapted to produce administrative instructions for organizing a sub-set of the signals to be transmitted over at least one transmission resource, wherein the administrative instructions produced by the at least one client computer specifies, for each signal to be transmitted, at least a time instance and a contents category, wherein the contents category for at least one sub-segment of each signal determines which sub-segment that will be presented in which subscriber receiver of the plurality of subscriber receivers; and the central management server adapted to receive, from the at least one client computer, the administrative instructions produced at the at least one client computer pertaining to the transmission of the signals to the subscriber receivers, and in response to the administrative instructions organize signals from the at least one signal source before transmitting the set of signals to at least one of the plurality of subscriber receivers.

2. A system according to claim 1, wherein the administrative instructions specifies, for each signal to be transmitted, at least a contents category and a time instance along a timeline.

3. A system according to claim 1, wherein a transmission unit is adapted to receive the signals from the central management server and, in accordance with an organization scheme produced by the central management server, transmit the signals via a central signal distribution system.

4. A system according to claim 1, wherein it comprises at least one billing unit adapted to produce billing information pertaining to a respective utilization of the transmission resources administrated by the central management server.

5. A system according to claim 1, wherein it comprises at least one auxiliary distribution channel which includes at least one distribution resource in addition to the central signal distribution system adapted to transmit signals to the subscriber receivers outside the central management server.

6. A system according to claim 1, wherein the signals represent at least one of text information, acoustic information, image information and video information.

7. A system according to claim 1, wherein at least one of the at least one client computer is represented by at least one of an advertiser operator, a satellite operator, a cable network operator, a TV operator or other distribution network operator.

8. A client computer for transmitting a set of signals to a plurality of subscriber receivers, wherein each signal represents information belonging to a particular contents category, comprising:

the client computer having a graphical user interface towards a central management server, and adapted to produce administrative instructions for organizing a sub-set of the signals to be transmitted over at least one channel, whereby the administrative instructions produced by the client computer specifies, for each signal to be transmitted at least a time instance and a contents category, wherein the contents category for at least one sub-segment of each signal determines which sub-segment that will be presented in which subscriber receiver of the plurality of subscriber receivers, and wherein the central management server is adapted to receive the administrative instructions pertaining to the transmission of the signals to the subscriber receivers from the client computer wherein the central management server is further adapted to, in response to the administrative instructions, organize signals from at least one signal source before transmitting the set of signals to the subscriber receivers.

9. A client computer according to claim 8, wherein the graphical user interface is configured to, for each of the signals to be transmitted on the at least one channel, present the signal's contents category, and for at least a sub-set of the signals to be transmitted on the at least one channel, enable a user to manipulate segments of each signal such that a particular sub-segment will be presented in each subscriber receiver of the subscriber receivers which has a profile category matching a contents category associated with the particular sub-segment.

10. A client computer according to claim 8, wherein the graphical user interface is configured to verify the content of the each of the signals to be transmitted with respect to the contents of any neighboring signal segments.

11. A client computer according to claim 8, wherein the graphical user interface is further configured to, for at least a sub-set of the signals to be transmitted on the at least one channel, enable the user to select a suitable sub-segment for each of a number of profile categories for a segment of a signal.

12. A client computer according to claim 10, wherein the graphical user interface is further configured to enable the user to, for each sub-segment select a profile category, wherein a default profile category is based on a compiled data set formed on basis of activity-monitoring information pertaining to signals having been presented in the subscriber receivers.

13. A client computer according to claim 10, wherein the graphical user interface is further configured to allow the user to, for each sub-segment select a geographical area within which subscriber receivers will present the sub-segment, wherein a default geographical area is based on positional information pertaining to signals having been presented in the subscriber receivers.

14. A client computer according to claim 10, wherein the graphical user interface is further configured to enable the user to, for each sub-segment select a priority level denoting a relative position of the sub-segment within a particular segment.

15. A client computer according to claim 8, comprising a compiler adapted to produce a preliminary organization of the signals on the at least one channel before transmitting corresponding administrative instructions to the central management server.

16. A client computer according to claim 14, wherein the graphical user interface is further configured to enable a user to manipulate the preliminary organization of the signals, and the client computer comprises processing means adapted for producing administrative instructions to the central management server.

17. A computer program product comprising at least one electronic computer readable storage memory storing computer executable instructions for transmitting a set of signals to a plurality of subscriber receivers, wherein each signal represents information belonging to a particular contents category, the executable instructions comprising:

first computer instructions for producing, at the client computer, administrative instructions for organizing a sub-set of the signals to be transmitted over at least one transmission resource, second computer instructions for receiving, at the central management server, the administrative instructions produced at the client computer pertaining to the transmission of the signals to the subscriber receivers and in response to the administrative instructions organizing signals from at least one signal source before transmitting the set of signals to the subscriber receivers, and third computer instructions for receiving, at the central management server the signals and, in accordance with the administrative instructions, transmitting these signals to at least a portion of the plurality of the subscriber receivers, wherein the contents category for at least one sub-segment of each signal determines which sub-segment that will be presented in which subscriber receiver of the plurality of subscriber receivers.

18. At least one electronic non-transitory computer readable storage, having at least one program recorded thereon, wherein the at least one program is adapted to transmit a set of signals to a plurality of subscriber receivers, wherein each signal represents information belonging to a particular contents category and comprises:

first computer instructions for producing, at the client computer, the administrative instructions for organizing a sub-set of signals to be transmitted over at least one transmission resource, second computer instructions for receiving, at the central management server, the administrative instructions produced at the client computer pertaining to the transmission of the signals to the subscriber receivers and in response to the administrative instructions organizing signals from at least one signal source before transmitting the set of signals to the subscriber receivers, and third computer instructions for receiving, at a central management server, the signals and, in accordance with the administrative instructions, transmitting these signals to the subscriber receivers, wherein the administrative instructions specifies, for each signal to be transmitted, at least a time instance and a contents category, and wherein the contents category for at least one sub-segment of each signal determines which sub-segment that will be presented in which subscriber receiver of the plurality of subscriber receivers.

19. A system according to claim 2, wherein an organization scheme specifies a scalable timeline which represent an absolute time reference for at least one transmission resource.

20. A system according to claim 2, wherein the timeline corresponding to the timeline in the client computer.

21. A client computer according to claim 8, wherein the graphical user interface is further configured to present the timeline in the client computer indicating a local time of the time zone in which the client computer is located.

22. A system according to claim 1, wherein the organization scheme at least indicates a start time instance and a vertical time indicator designating a present time instance.

23. A system according to claim 1, wherein each subscriber receiver of the plurality of subscriber receivers comprises an interpretation unit and a user specific key, wherein each subscriber receiver is configured to present a particular received signal to a user based at least in part on the user specific key.

* * * * *